US010205283B2

(12) United States Patent
Dickey

(10) Patent No.: US 10,205,283 B2
(45) Date of Patent: Feb. 12, 2019

(54) REDUCED CROSS-SECTION ENCLOSED POWER OUTLET

(71) Applicant: JTech Solutions, Inc., San Ramon, CA (US)

(72) Inventor: J. Scott Dickey, San Ramon, CA (US)

(73) Assignee: JTech Solutions, Inc., San Ramon, CA (US)

(*) Notice: Subject to any disclaimer, the term of this patent is extended or adjusted under 35 U.S.C. 154(b) by 0 days.

(21) Appl. No.: 15/530,696

(22) Filed: Apr. 13, 2017

(65) Prior Publication Data
US 2018/0301849 A1 Oct. 18, 2018

(51) Int. Cl.
H01R 4/00 (2006.01)
H01R 13/639 (2006.01)
H01R 24/20 (2011.01)
H02G 3/08 (2006.01)
H01R 13/447 (2006.01)
H02G 15/08 (2006.01)
H01R 35/00 (2006.01)
G05B 9/02 (2006.01)

(52) U.S. Cl.
CPC ....... H01R 13/6395 (2013.01); H01R 13/447 (2013.01); H01R 24/20 (2013.01); H02G 3/08 (2013.01); G05B 9/02 (2013.01)

(58) Field of Classification Search
CPC .......... H01R 4/00; H01R 35/00; H02G 15/08; H02G 3/0608; H01H 3/227; H01H 47/001; H04Q 1/14; H04Q 1/141
USPC ..... 361/725, 726, 826, 827; 174/72 R, 72 A, 174/86, 97, 480; 307/116, 326, 328
See application file for complete search history.

(56) References Cited

U.S. PATENT DOCUMENTS 3,433,886 A 3/1969 Myers
3,590,910 A 7/1971 Lorenz
3,627,030 A 12/1971 Lorenz
3,872,355 A 3/1975 Klein
3,972,579 A 8/1976 Kohaut et al.
(Continued)

FOREIGN PATENT DOCUMENTS

AU 201716102 10/2017
AU 201716105 10/2017
(Continued)

OTHER PUBLICATIONS

International Preliminary Report on Patentability for International Application PCT/US2014/040750, Report dated Apr. 19, 2016, dated Apr. 28, 2016, 10 Pgs.
(Continued)

Primary Examiner — Binh Tran
(74) Attorney, Agent, or Firm — KPPB LLP

(57) ABSTRACT

Power outlets adapted for installation within an enclosure are provided. Power outlets are provided having a safety interlock adapted to prevent the creation of a hazardous condition within the enclosure as a result of the continued operation of an electrical device within the enclosed space. The safety interlock may include current limiting circuitry and hardware, hazard sensing devices interconnected with such current limiting circuitry and hardware or other circuit breaker switches, and combinations of such safety interlocks. The power outlets may also be adapted for installation within a movable enclosure, such as, for example, a drawer.

18 Claims, 14 Drawing Sheets

(56) References Cited

U.S. PATENT DOCUMENTS

| | | |
|---|---|---|
| 4,332,137 A | 6/1982 | Hayes, Jr. |
| 4,551,577 A | 11/1985 | Byrne |
| 4,658,577 A | 4/1987 | Klein |
| 4,659,909 A | 4/1987 | Knutson |
| 4,737,769 A | 4/1988 | Masot |
| 4,901,060 A | 2/1990 | Liu |
| 5,015,337 A | 5/1991 | Fraser |
| D317,687 S | 6/1991 | Fabius et al. |
| 5,023,396 A | 6/1991 | Bartee et al. |
| 5,143,552 A | 9/1992 | Moriyama |
| 5,169,418 A | 12/1992 | Honda et al. |
| 5,318,453 A | 6/1994 | Hwang et al. |
| 5,508,568 A | 4/1996 | Mammen |
| 5,625,345 A | 4/1997 | Stark et al. |
| 5,742,464 A | 4/1998 | Ceola et al. |
| 5,995,400 A | 11/1999 | Park et al. |
| 6,028,267 A | 2/2000 | Byrne |
| 6,049,143 A | 4/2000 | Simpson et al. |
| 6,086,390 A | 7/2000 | Haut |
| D436,837 S | 1/2001 | Beal et al. |
| 6,216,778 B1 | 4/2001 | Corwin et al. |
| 6,290,518 B1 | 9/2001 | Byrne et al. |
| 6,336,691 B1 | 1/2002 | Maroney |
| 6,377,458 B1 | 4/2002 | Morris et al. |
| 6,380,852 B1 | 4/2002 | Hartman |
| 6,435,903 B1 | 8/2002 | Nelson |
| 6,440,221 B2 | 8/2002 | Shamouilian et al. |
| 6,446,941 B1 | 9/2002 | Maheshwari et al. |
| 6,467,286 B2 | 10/2002 | Hasebe et al. |
| 6,478,587 B2 | 11/2002 | Sharples et al. |
| 6,530,806 B2 | 3/2003 | Nelson et al. |
| 6,582,296 B2 | 6/2003 | Komiyama |
| 6,819,563 B1 | 11/2004 | Chu et al. |
| 6,859,366 B2 | 2/2005 | Fink |
| 6,886,361 B2 | 5/2005 | Flynn |
| D505,858 S | 6/2005 | O'Keene |
| D507,477 S | 7/2005 | Pfister |
| 6,942,502 B2 | 9/2005 | Sharples et al. |
| 6,979,209 B2 | 12/2005 | Griepentrog et al. |
| 7,078,623 B1 | 7/2006 | Sheehan et al. |
| 7,152,426 B1 | 12/2006 | Cowans |
| 7,154,402 B2 | 12/2006 | Dayoub |
| 7,163,409 B1 | 1/2007 | Huang et al. |
| 7,173,820 B2 | 2/2007 | Fink et al. |
| 7,262,830 B2 | 8/2007 | Shigaraki |
| 7,285,733 B2 | 10/2007 | Bowman et al. |
| D559,087 S | 1/2008 | Ciungan |
| 7,327,246 B2 | 2/2008 | Schoor |
| D577,729 S | 9/2008 | Derry et al. |
| 7,445,300 B2 | 11/2008 | Collins et al. |
| 7,505,237 B2 | 3/2009 | Baxter |
| 7,575,467 B2 | 8/2009 | Ferguson |
| 7,626,120 B1 | 12/2009 | Golden et al. |
| 7,736,178 B2 | 6/2010 | Byrne et al. |
| 7,806,091 B2 | 10/2010 | Esau et al. |
| 7,824,185 B2 | 11/2010 | Chien |
| 7,837,483 B2 | 11/2010 | Haut et al. |
| 7,934,932 B1 | 5/2011 | Lee et al. |
| 7,938,174 B2 | 5/2011 | Yanagida et al. |
| 7,967,616 B1 | 6/2011 | Lee et al. |
| 7,978,447 B2 | 7/2011 | Baxter |
| 7,999,419 B2 | 8/2011 | Drane et al. |
| 8,000,074 B2 | 8/2011 | Jones et al. |
| 8,057,243 B2 | 11/2011 | Lee et al. |
| 8,068,034 B2 | 11/2011 | Shah et al. |
| 8,084,992 B2 | 12/2011 | Scheffy et al. |
| 8,139,337 B2 | 3/2012 | Baxter et al. |
| 8,238,070 B2 | 8/2012 | Kopelman |
| 8,277,233 B2 | 10/2012 | Su |
| 8,348,683 B2 | 1/2013 | Row et al. |
| 8,351,200 B2 | 1/2013 | Arimilli et al. |
| 8,450,879 B2 | 5/2013 | Chilvers |
| 8,475,186 B1 | 7/2013 | Sikkema et al. |
| 8,482,884 B2 | 7/2013 | Hennessey, Jr. |
| 8,604,935 B2 | 12/2013 | Shah |
| 8,605,402 B2 | 12/2013 | Ward |
| 8,622,481 B2 | 1/2014 | Niederriter |
| D707,109 S | 6/2014 | Leung |
| 9,136,653 B2 | 9/2015 | Dickey |
| 9,331,430 B2 * | 5/2016 | Dickey .............. H01R 13/6395 |
| D765,033 S | 8/2016 | Oosterman et al. |
| D796,519 S | 9/2017 | Hung |
| 10,003,159 B2 | 6/2018 | Dickey |
| D822,671 S | 7/2018 | Chu |
| 2001/0044161 A1 | 11/2001 | Komiyama |
| 2002/0043978 A1 | 4/2002 | McDonald |
| 2002/0064572 A1 | 5/2002 | Minogue |
| 2003/0159307 A1 | 8/2003 | Sago et al. |
| 2004/0035569 A1 | 2/2004 | Suenaga et al. |
| 2004/0112584 A1 | 6/2004 | Weng |
| 2004/0231351 A1 | 11/2004 | Wyatt et al. |
| 2006/0006838 A1 | 1/2006 | Clarke |
| 2006/0081390 A1 | 4/2006 | Lange et al. |
| 2007/0000641 A1 | 1/2007 | Yanagida et al. |
| 2007/0052380 A1 | 3/2007 | Lai |
| 2007/0230126 A1 | 10/2007 | Pautsch et al. |
| 2008/0035307 A1 | 2/2008 | Yamakawa |
| 2008/0110610 A1 | 5/2008 | Lifson et al. |
| 2009/0142947 A1 | 6/2009 | Byrne et al. |
| 2009/0167537 A1 | 7/2009 | Feliss |
| 2009/0197352 A1 | 8/2009 | Ueno et al. |
| 2009/0201145 A1 | 8/2009 | Vasquez |
| 2010/0033024 A1 | 2/2010 | Crucs |
| 2010/0073839 A1 | 3/2010 | Baxter |
| 2010/0124849 A1 | 5/2010 | Winstanley et al. |
| 2010/0273114 A1 | 10/2010 | Yoshida |
| 2010/0330896 A1 | 12/2010 | Ohba et al. |
| 2011/0056675 A1 | 3/2011 | Barringer et al. |
| 2011/0117760 A1 | 5/2011 | Winstanley et al. |
| 2011/0177703 A1 | 7/2011 | Lin et al. |
| 2012/0187746 A1 | 7/2012 | Niederriter |
| 2012/0241135 A1 | 9/2012 | Takigawa et al. |
| 2013/0048580 A1 | 2/2013 | Bailey et al. |
| 2014/0077042 A1 | 3/2014 | Niederriter |
| 2015/0108832 A1 | 4/2015 | Dickey |
| 2015/0372423 A1 * | 12/2015 | Dickey .............. H01R 13/6395 307/24 |
| 2015/0380886 A1 | 12/2015 | Oosterman et al. |
| 2016/0211615 A1 | 7/2016 | Dickey |

FOREIGN PATENT DOCUMENTS

| | | |
|---|---|---|
| CN | 2256603 Y | 6/1997 |
| CN | 202664713 U | 1/2013 |
| CN | 202917882 U | 5/2013 |
| EP | 2142040 A2 | 1/2010 |
| JP | 4400918 B2 | 1/2010 |
| KR | 100813683 B1 | 3/2008 |
| WO | 198700976 | 2/1987 |
| WO | 2007022490 A2 | 2/2007 |
| WO | 2007139918 A2 | 12/2007 |
| WO | 2008133798 A2 | 11/2008 |
| WO | 2015057276 A1 | 4/2015 |

OTHER PUBLICATIONS

International Search Report and Written Opinion for International Application PCT/US2014/040750, report completed Sep. 15, 2014, dated Oct. 24, 2014, 11 Pages.

Lindvall et al., "Fracture Mechanics for a Heat Exchanger Gasket", www.byggmek.lth.se, 2004, 7 pgs.

"Amazon.com: Docking Drawer 0290-20533W-AUS Trio-Aus in Drawer Outlet", Published May 1, 2018.

"Amazon.com: Docking Drawer Blade Duo", Published Aug. 1, 2018, 1 pg.

"Amazon.com: Docking Drawer Blade In-Drawer Charging Outlet", Published Apr. 9, 2018, 1 pg.

"Amazon.com: Docking Drawer Style Drawer 21 Flush In-Drawer Power Outlet with Thermostatic Shutoff", Published Mar. 24, 2017, 1 pg.

(56) References Cited

OTHER PUBLICATIONS

"Amazon.com: Docking Drawer USB Narrow In-Drawer Charging Outlet (White) with 4 USB Ports", Published Aug. 1, 2018, 1 pg.

* cited by examiner

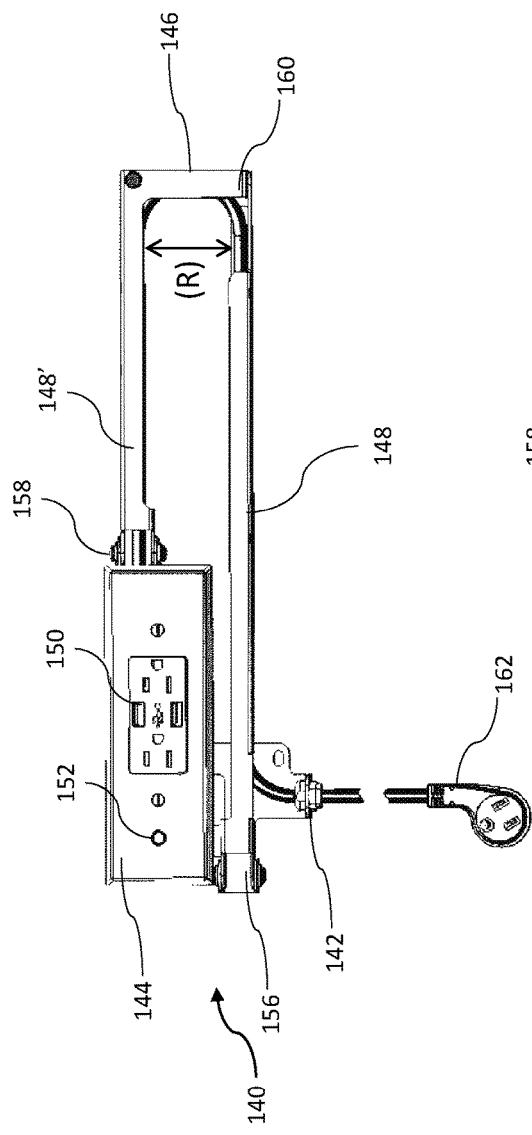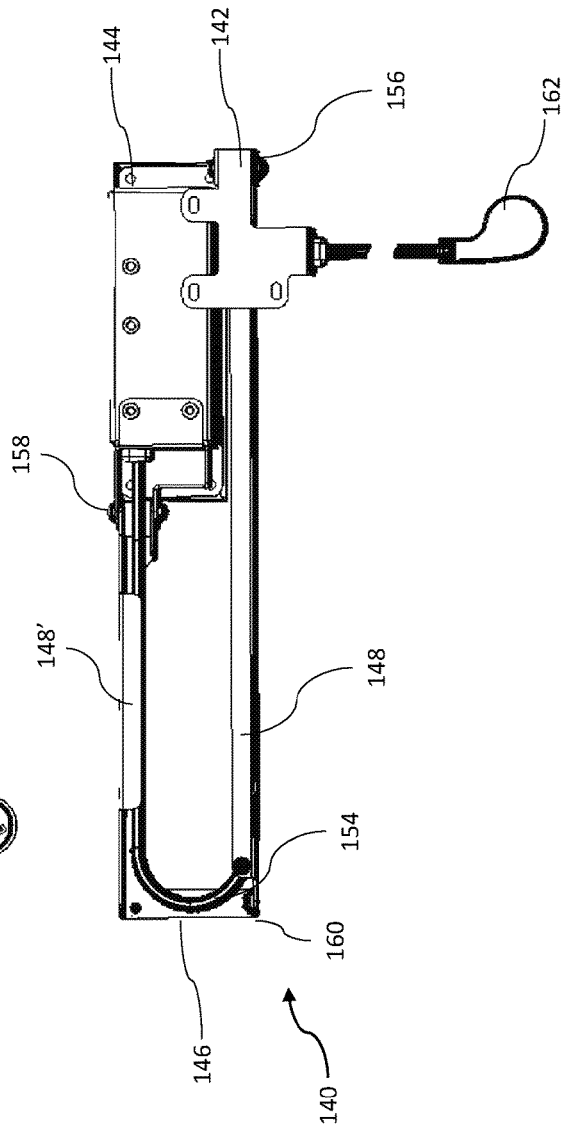
FIG. 5A
FIG. 5B

REDUCED CROSS-SECTION ENCLOSED POWER OUTLET

FIELD OF THE INVENTION

The current invention is directed generally to enclosed power outlets; and more particularly to electrical power outlets that can be positioned within a structure, and that can in certain cases additionally allow for movement of the power outlet relative to the source of power, and that have a reduced cross-sectional width.

BACKGROUND OF THE INVENTION

Electrical power outlets, and in particular alternating current (AC) power sockets, are devices that allow electrically operated equipment to be connected to the primary alternating current power source in a building. Electrical outlets can differ in voltage and current rating, as well as in the shape, size and type of connector they are adapted for use with. The types used in each country are set by national standards, some of which are listed in the IEC technical report TR 60083, the disclosure of which is incorporated herein by reference. Plugs and socket-outlets for domestic and similar general use standardized in member countries of IEC.

Regardless of the specific design and technical specification, a power outlet is typically formed of one or more sockets, which are fixed on a piece of equipment or a building structure and connected to an energized electrical circuit, and are adapted to cooperate with a movable connector attached to an electrically operated device. The sockets are designed to prevent exposure of bare energized contacts. To reduce the risk of failure or user misuse, power outlet systems often incorporate both physical safety features, such as, for example, recessed slots or holes, insulated sleeves, blocking shutters, orientation control; as well as electrical safety features, such as, for example, a protective earth connection to isolate a faulty appliance from the source.

Despite the advanced development of power outlets, a need still exists for electrical power outlets adapted specifically for installation within an enclosed structure, such as a cabinet or piece of furniture.

SUMMARY OF THE INVENTION

The current invention is directed generally to code compliant power outlet assemblies that can be placed within an enclosed structure.

A power outlet assembly for an enclosure including:
- at least one power outlet electrically interconnectable with at least one electrical device;
- at least one power source electrically interconnected to said at least one power outlet for providing a source of electrical energy to said power outlet, wherein the power outlet is movable within a defined range relative to said power source along a predefined path at least between a first position where the power outlet is distal to the power source and a second position where the power outlet is proximal to the junction box;
- an arm disposed in pivoting relationship between the at least one power outlet and the at least one power source, the arm formed of two rigid elongated arms, wherein a first rigid elongated arm has a first end that is pivotable about a point proximal the power source, wherein a second rigid elongated arm has a first end that is pivotable about a point proximal the power outlet, wherein the first and second rigid elongated arms are pivotally interconnected at a second end of each thereof about a pivoting axis transverse to the direction of the predefined path such that that first and second rigid elongated arms are positioned vertically adjacent to each other when disposed in the second position;
- a flexible electrical interconnector disposed along the arm in a conductive relation between the power source and power outlet, said flexible electrical interconnector adapted to provide a continuous electrical interconnection between the power source and power outlet without restricting the range of motion of the power outlet relative to the power source within said defined range such that continuous power is supplied from the power source to the power outlet independent of the relative positions of the power source and power outlet;
- at least one safety interlock having at least one sensor capable of detecting at least one hazardous condition within the environment of said enclosure, the at least one safety interlock being adapted to interrupt the flow of electrical current between the at least one power source and the at least one power outlet upon detection of one or more of the at least one hazardous conditions;
- wherein the at least one power outlet is accessible to the at least one electrical device along the entire defined range of the predefined path.

In other embodiments the at least one sensor is selected from the group consisting of a smoke detector, heat detector, and toxic gas monitor.

In still other embodiments the heat detector comprises a thermostat.

In yet other embodiments the power outlet assembly comprises at least two safety interlocks.

In still yet other embodiments the assembly also includes a current limiting safety interlock adapted to prevent the flow of current above a specified amperage from the power source to the power outlet.

In still yet other embodiments the assembly also includes a rectifier in electrical connection with the power source and adapted to convert the incoming electrical current from AC to DC.

In still yet other embodiments the assembly also includes a transmitter in signal communication with the at least one safety interlock for communicating the status of the power outlet assembly to a user.

In still yet other embodiments the transmitter is configured to automatically transmit upon activation of any one of the at least one safety interlocks.

In still yet other embodiments the power source is in a fixed position and the power outlet is movable relative to said power source.

In still yet other embodiments the assembly also includes at least one safety interlock switch configured to activate the operation of the at least one safety interlock when the power outlet is in the second position and deactivate the at least one safety interlock when the power outlet is in the first position.

In still yet other embodiments the first and second rigid elongated arms combine to provide a predefined curved path to the flexible electrical interconnector such that the flexible electrical interconnector is prevented from being bent below a minimum bend radius, the minimum bend radius being defined along a vertical axis disposed transverse to the direction of the pre-positioned path at least when the first and second rigid elongated arms are in the second position.

In still yet other embodiments the rigid elongated arms collectively define an internal channel within which the flexible electrical interconnector is disposed and at least partially enclosed.

In still yet other embodiments the flexible electrical interconnector and rigid elongated arms are configured such that when the power outlet is proximal to the power source along the predefined path, the flexible electrical interconnector and the elongated arms are bent into a single U-shape having a first end interconnected with the power source and a second end interconnected with the power outlet and having a bend radius at least equal to the specified minimum bend radius, and wherein the U-shape is disposed has a folded length approximately half the length of the defined range of motion of the power outlet, and is disposed within a vertical plane disposed along the vertical axis.

In still yet other embodiments a first end of the first rigid elongated arm distal to the power source comprises an angled portion that is bent transverse to a longitudinal axis of the first rigid elongated arm and parallel to the pivoting axis, and wherein the first rigid elongated arm is pivotally joined to the second rigid elongated arm through said angled portion.

In still yet other embodiments a first end of the second rigid elongated arm distal to the power source comprises an angled portion that is bent transverse to a longitudinal axis of the second rigid elongated arm and parallel to the pivoting axis, and wherein the second rigid elongated arm is pivotally joined to the first rigid elongated arm through said angled portion.

Other embodiments are directed to a power equipped enclosure including:
- an enclosure defining an internal volume, said internal volume being accessible;
- at least one power outlet disposed within the internal volume of the enclosure outlet, the at least one power outlet being electrically interconnectable with at least one electrical device;
- at least one power source electrically interconnected to said at least one power outlet for providing a source of electrical energy to said power outlet, wherein the power outlet is movable within a defined range relative to said power source along a predefined path at least between a first position where the power outlet is distal to the power source and a second position where the power outlet is proximal to the power source;
- an arm disposed in pivoting relationship between the at least one power outlet and the at least one power source, the arm formed of two rigid elongated arms, wherein a first rigid elongated arm has a first end that is pivotable about a point proximal the power source, wherein a second rigid elongated arm has a first end that is pivotable about a point proximal the power outlet, wherein the first and second rigid elongated arms are pivotally interconnected at a second end of each thereof about a pivoting axis transverse to the direction of the predefined path such that that first and second rigid elongated arms are positioned vertically adjacent to each other when disposed in the second position;
- a flexible electrical interconnector in a conductive relation between the power source and power outlet, said flexible electrical interconnector adapted to provide a continuous electrical interconnection between the power source and power outlet without restricting the range of motion of the power outlet relative to the power source within said defined range such that continuous power is supplied from power source to the power outlet independent of the relative positions of the power source and power outlet;
- at least one safety interlock having at least one sensor disposed within the enclosure and capable of detecting at least one hazardous condition within the environment of said enclosure, the at least one safety interlock being adapted to interrupt the flow of electrical current between the at least one power source and the at least one power outlet upon detection of one or more of the at least one hazardous condition; and
- wherein the at least one power outlet is accessible to the at least one electrical device along the entire defined range of the predefined path.

In other embodiments the at least one sensor is selected from the group consisting of a smoke detector, heat detector, and toxic gas monitor.

In still other embodiments the heat detector comprises a thermostat.

In yet other embodiments the power outlet assembly comprises at least two safety interlocks.

In still yet other embodiments the enclosure also includes a current limiting safety interlock adapted to prevent the flow of current above a specified amperage from the junction box to the power outlet.

In still yet other embodiments the enclosure also includes a rectifier in electrical connection with the power source and adapted to convert the incoming electrical current from AC to DC.

In still yet other embodiments the enclosure also includes a transmitter in signal communication with the at least one safety interlock for communicating the status of the power outlet assembly to a user.

In still yet other embodiments the transmitter is configured to automatically transmit upon activation of any one of the at least one safety interlocks.

In still yet other embodiments the enclosure includes at least one movable element, and wherein the power source and power outlet are arranged such that the movement of the at least one movable element moves the power outlet relative to the power source.

In still yet other embodiments the enclosure also includes at least one safety interlock switch configured to activate the operation of the at least one safety interlock when the power outlet is in the second position and deactivate the at least one safety interlock when the power outlet is in the first position.

In still yet other embodiments the first and second rigid elongated arms combine to provide a predefined curved path to the flexible electrical interconnector such that the flexible electrical interconnector is prevented from being bent below a minimum bend radius, the minimum bend radius being defined along a vertical axis disposed transverse to the direction of the pre-positioned path at least when the first and second rigid elongated arms are in the second position.

In still yet other embodiments the rigid elongated arms collectively define an internal channel within which the flexible electrical interconnector is disposed and at least partially enclosed.

In still yet other embodiments the flexible electrical interconnector and rigid elongated arms are configured such that when the power outlet is proximal to the junction box along the predefined path, the flexible electrical interconnector and the elongated arms are bent into a single U-shape having a first end interconnected with the power source and a second end interconnected with the power outlet and having a bend radius at least equal to the specified minimum bend radius, and wherein the U-shape has a folded length approximately half the length of the defined range of motion of the power outlet, and is disposed within a vertical plane disposed along the vertical axis.

In still yet other embodiments the movable element is a drawer.

In still yet other embodiments the power outlet has an orientation selected from one of either disposed vertically in the side of the drawer, or disposed horizontally in the bottom of the drawer.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims of the current invention will be more fully understood with reference to the following figures, which are presented as exemplary embodiments of the invention and should not be construed as a complete recitation of the scope of the invention, wherein:

FIGS. 5a to 5d provide schematics of a power outlet assembly adapted for installation in movable relation to a power source in accordance with embodiments of the invention.

DETAILED DESCRIPTION OF THE INVENTION

Figure 1A:
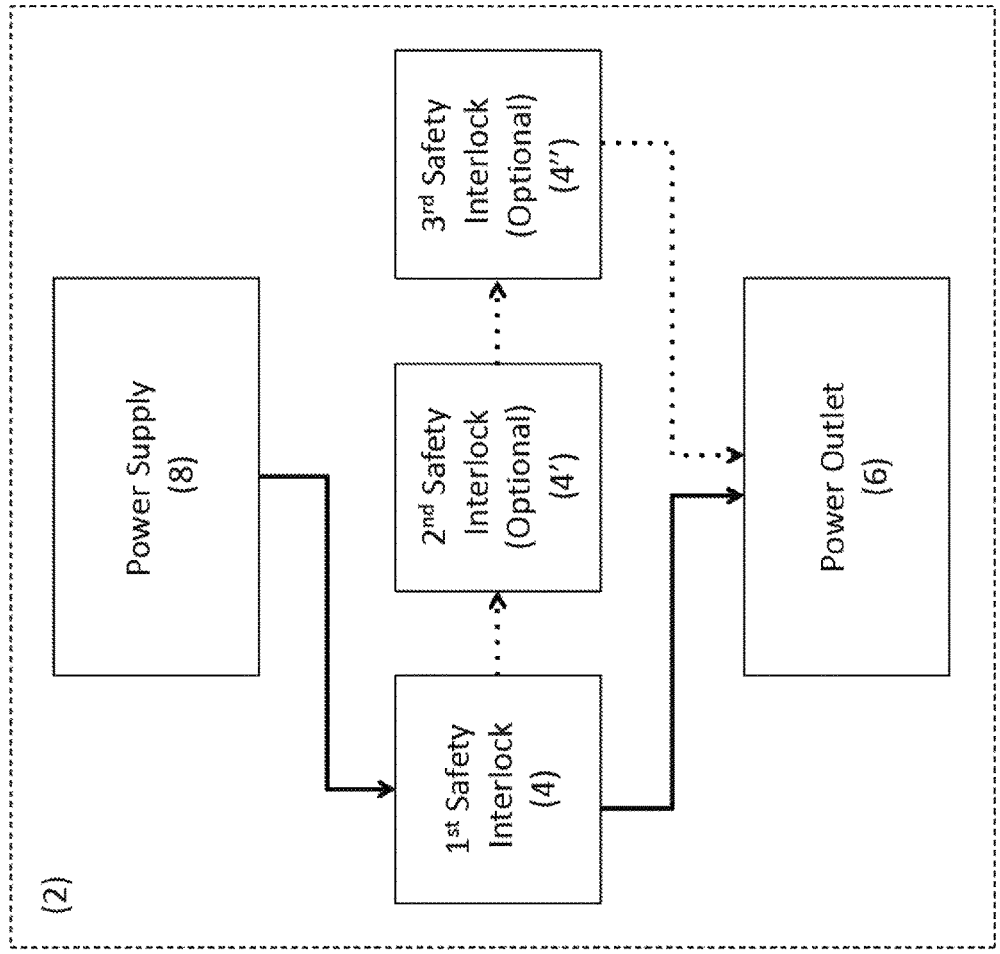
FIGS. 1a and 1b provide schematics of power outlet assembly layouts in accordance with many embodiments of the invention.

Turning to the figures and schematics, power outlets adapted for installation within an enclosure are provided. In many embodiments the power outlet may be adapted for installation within a movable enclosure, such as, for example, a drawer. In some embodiments, the electrical interconnection between the power outlet and the source of power is flexible and has a length and geometry that allows for the consistent travel of the power outlet a specified distance away from the source of power. In many such embodiments the flexible power coupling is configured such that the thickness of the power outlet and flexible power coupling is minimized. In many embodiments, outlets are provided having a safety interlock adapted to prevent the creation of a hazardous condition within the enclosure as a result of the continued operation of an electrical device within the enclosed space. In some embodiments, the safety interlock may include current limiting circuitry and hardware, hazard sensing devices interconnected with such current limiting circuitry and hardware or other circuit breaker switches, and combinations of such safety interlocks. In many embodiments the power outlets may be adapted to provide a current suitable only for low amp requirements, such as, for example, for the charging of electronic devices. In other embodiments the power outlets may be adapted to provide a current suitable for standard electrical devices, such as, for example, electrical bathroom appliances like hairdryers, curling irons, heated curlers, etc.

It has long been realized that mounting power outlets within enclosures can create arrangements with a great deal of utility, for example, by providing interior lighting, temperature control, or simply power availability for charging or operating electrical devices within, for example, an enclosed cabinet, drawer, etc. Accordingly, many attempts have been made to integrate power outlets within a variety of enclosures, including, for example, drawers, storage chests and cabinets. (See, e.g., U.S. Pat. No. 8,084,992; PCT Pub. No. WO2007139918; PCT Pub. No. 2007022490, and EP Pub. No. 2142040, the disclosures of each of which are incorporated herein by reference.) However, in designing these power integrated enclosures, structures and equipment, little thought has thus far been given to mitigating the inherent hazards created by this power equipment, particularly in the case of general purpose power outlets to which any electrical device or appliance, including unauthorized or non-recommended devices and appliances, may be connected, and which may thus give rise to unexpected hazards when powered-on or left unattended in a powered-on state within the enclosure. In particular, while many of these devices may include safety systems capable of detecting an electrical fault in the system, such as a ground or arc fault, or some other kind of short-circuit, none have considered methods and systems for detecting hazards that may be created within an enclosure from the proper operation of an electrical device/appliance.

This is problematic, as in accordance with regulations in most countries, including the United States, individuals may face liability for negligently creating a hazardous situation from an electrical installation that results in loss of life or property. To avoid such liability it is, therefore, important to follow a standard set of building and electrical code laws, such as those issued, for example, in the United States in the National Electrical Code (NEC), which is itself part of the National Fire Codes published by the National Fire Protection Association (NFPA). Electrical devices and appliances also have to be designed, manufactured, tested or inspected, and marked in accordance with requirements of an appropriate listing agency, such as, for example the Underwriters Laboratories (UL), MET Laboratories, Inc. (MET), Intertek Group (ETL), Canadian Standards Association (CSA), and FM Approvals (FM), among others. The absence of such approval means that general purpose power outlets for use and installation in enclosures, though promising for many applications, are not available for widespread use.

Accordingly, in many embodiments, power outlet assemblies are provided that include one or more safety interlocks adapted to prevent the creation of a hazard by the operation of electrical devices and appliances while interconnected with the power outlet within an enclosure. FIG. 1a provides a generalized schematic diagram showing the operational layout of power outlets in accordance with many embodiments. As shown, the power outlet assembly (2) generally comprises one or more safety interlocks (4, 4' and 4") in electrical interconnection between a power outlet (6) and the associated power source (8). As installed, at least the power outlet is installed within the subject enclosure, as well as those safety interlocks necessary to be included within the subject enclosure to detect a hazardous condition generated by the operation of the power outlet. Regardless of the number or type of safety interlocks included with the power outlet assembly, each could be arranged such that the triggering or activation of a single safety interlock would terminate current from the power source to the power outlet. Note, although three safety interlocks are shown in FIG. 1a, it will be understood that any number and arrangement of safety interlocks may be incorporated into the device such that one or more possible hazardous conditions associated with the use or misuse of the power outlet assembly may be prevented.

Figure 1B:
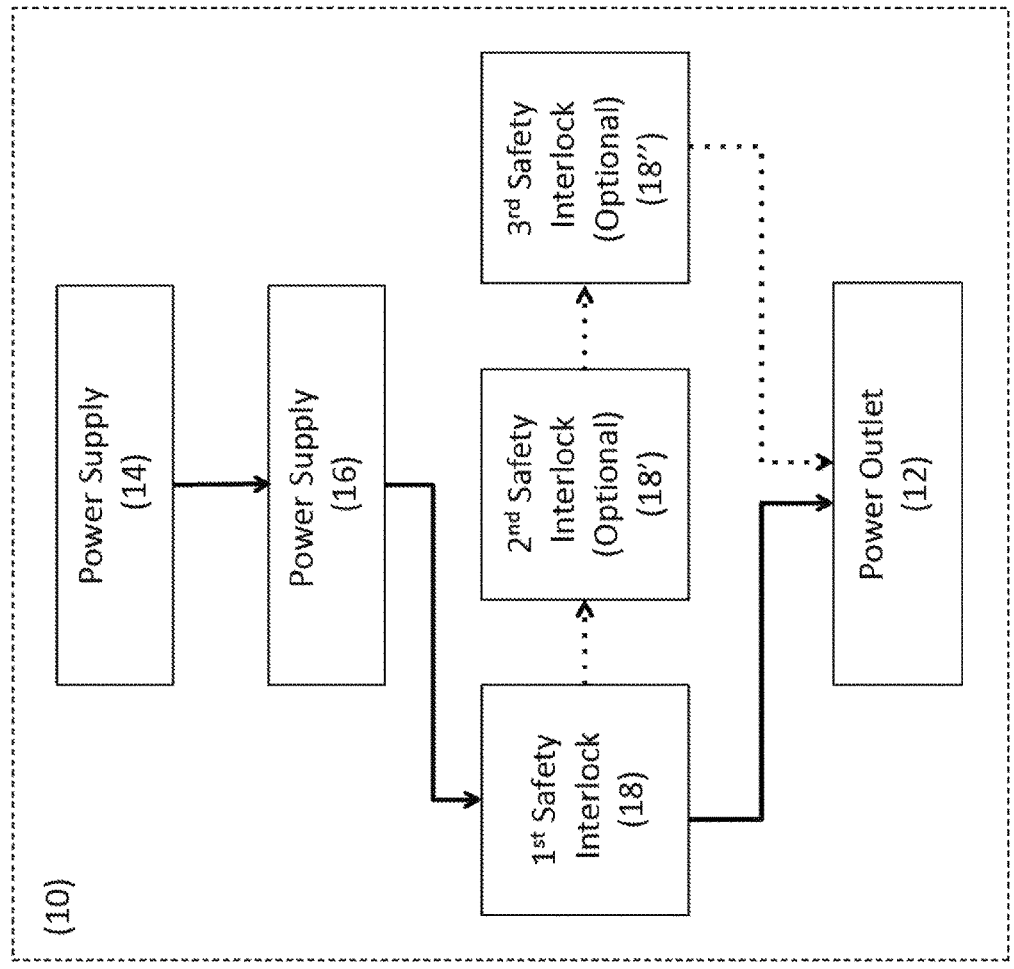

FIG. 1b provides alternative embodiments of power outlet assemblies (10) that incorporate a power outlet (12) that is movable relative to the power source (14). As shown, in such embodiments the assemblies also incorporate a flexible electrical interconnector (16) disposed between the incoming power source and the power outlet such that the power outlet may be moved in relation to the incoming power source without creating a disconnected between the power source and power outlet. Note although the flexible electrical interconnector (16) is shown as being disposed between the power source (14) and the one or more safety interlocks (18, 18' and 18") it will be understood that the flexible electrical interconnector may be disposed anywhere between the incoming power source and the power outlet such that the power outlet may be moved in relation to the incoming power source without creating a disconnected between the power source and power outlet.

While the above schematics describe a single power outlet, it will be understood that at any enclosure may incorporate any number of power outlets and/or power sources interconnected with any number of electrical interconnections and safety interlocks. Finally, while the above schematics show some generalized features of embodiments of power outlet assemblies, it will be understood that additional electrical and mechanical features and devices may be incorporated into the power outlet assemblies. For example, in embodiments the assembly may include a ground fault circuit interrupter (GFCI) such that the assembly may be used in wet locations, as defined in the NEC code, or it may incorporated an arc-fault circuit interrupter (AFCI) to prevent arcs from hot to neutral that can develop when insulation between wires becomes frayed or damaged. Likewise, the power outlet assembly may include dimmer circuits, illuminated outlet covers, wireless or wire remote control, transmitters, timer circuits, etc.

Definitions

Before proceeding to specific examples of possible power outlet assemblies, some general definitions are provided concerning the subject components.

A power source, for the purposes of embodiments, refers to any type of conduit, housing, wiring or hardware that brings any general-purpose alternating-current (AC) electric power source, such as, for example, household power, household electricity, house current, powerline, domestic power, wall power, line power, AC power, city power, street power, and grid power, into an enclosure. It will be understood that any voltages and frequencies may be used with the power outlet assembly embodiments dependent on the distribution regulations and rules set forth for a particular locale. For example, in one exemplary embodiment the power outlet power source would include a circuit capable of supplying a 120V/10 A maximum current, or alternatively 220V or 440V dependent on the requirements of any suitable electric power standard, such as, for example any of those published by the International Electrotechnical Commission (IEC) in the IEC Technical Report 60083, the substance of which is incorporated herein by reference. In addition, the power source may include suitable rectifying circuits for converting or rectifying the AC power from the external source of power into DC power with a standard AC to DC converter that is commonly used to power many devices. Any suitable DC current may be thus provided depending on the power requirements of the device to be powered by the power outlet.

A safety interlock, for the purposes of embodiments, refers to any device, circuit or sensor capable of detecting an unsafe condition or hazard generated by the operation of the enclosed power outlet. Embodiments of such safety interlocks may include mechanical or electromechanical devices adapted to prevent the flow of current through the power outlet, and thus into the electrical device or appliance when the operation of the electrical device or appliance is creating a hazard despite the fact that both the electrical circuit and the electrical device are operating within tolerances. Embodiments of such safety interlocks may include current limiting devices, such as circuit breakers and/or fuses adapted to detect short circuits between the live and neutral wires, or the drawing of more current than the power outlets is rated to handle to prevent overheating and fire. In still other embodiments such safety interlocks may include sensors adapted for detecting a hazardous condition in the environment of the enclosure (such as overheating, smoke, poisonous gas, etc.). Such sensors may incorporate integrated circuit interrupters, or may be interconnected to a circuit interrupter such as a circuit breaker or fuse such that upon detection of a hazardous condition current from the power source to the power outlet could be terminated. Finally, such safety interlocks may include position sensors or switches for activating the safety interlocks only when the enclosure within which the power outlet has been installed is in a configuration (such as a closed condition) in which the device interconnected to the power outlet would be concealed within the enclosure. The system may also include any combination of such safety interlocks.

A power outlet, for the purposes of embodiments, refers to any electrical socket for domestic, commercial and light industrial purposes generally provide any number or arrangement of electrical connections to the supply conductors. For example, the power outlet may include two pin sockets (providing, for example, neutral and line connections), three pin sockets (that provide, in addition, a protective earth connection), some sockets may have two line connections (such as a split phase system having 240 V between line connections each at 120 V with respect to earth ground), or a three-phase system (having, for example, 208 V between contacts and only 120V between each contact and earth ground). This power outlet could also be delivered in any combination of such receptacles, such as, for example, split between one or more standard two or three prong connections, or standard connections and specialized connectors including, USB, thunderbolt, firewire, etc. In addition, although the above discussion and figures show standard in-wall power outlets, it should be understood that embodiments of the invention are also directed to alternative power outlet designs including power strips and the like.

An electrical interconnector, for the purposes of embodiments, may mean any wire or cable having an appropriate current rating. It should be understood that no restrictions are placed on the exact construction or design of the electrical interconnectors used or how they are configured. For example, wire used as an electrical interconnector may be unprotected, or be installed within appropriate conduit or ducting to protect the wire from sharp metal edges of cut conduits or cabinet holes. In addition, such electrical interconnectors are not restricted solely to wired devices, methods and devices for the wireless transmission of electrical power and signals may also be incorporated within many embodiments.

A movable power outlet, for the purposes of embodiments, may mean a power outlet that is movable relative to the incoming power source for the enclosure. For embodiments where a movable power outlet is incorporated into the enclosure, the electrical interconnector may include at least one flexible or extendable portion that is adapted to provide a certain distance of travel between the movable power outlet and the power source and prevent wearing, tangling or other potential hazards to arise in the electrical interconnector, as will be described in greater detail below.

An enclosure, for the purposes of embodiments, may be any structure that defines an internal volume into which the power outlet and any electrical device or appliance interconnected therewith are at least partially enclosed or contained. The enclosure should have at least one opening into the internal volume such that the power outlet may be accessed, such opening may be fixed or may be sealable, such as by a door, drawer, hatch, etc. The enclosure may be fixed, such as a permanently attached cabinet, or may be movable, such as a movable tool chest or other piece of movable furniture, or the enclosure may be fixed or movable and incorporate movable elements into which the power outlet is installed, such as a drawer within a fixed or movable cabinet.

Although not described in the sections above, additional circuits and hardware could be provided to allow for additional functionality including, for example, other power and data connections, as well as interrupts or switches that would turn on or off the circuit based on the relative position of the outlet box to the junction box. In addition, other circuits might be incorporated for the measurement and reporting of power consumption for each receptacle, and either standard or user input thresholds or standards that can be compared against so that a user could be alerted to abnormal or undesirable power situations. In another example, the circuitry might include timing circuitry or light-sensing circuitry that could be used to independently control the power circuitry at the user's direction. It will be understood that these elements are not intended to be limiting, and extensions thereof, as well as other structures and devices capable of incorporation embodiments of power outlet assemblies, will be described below in association with the following exemplary embodiments.

Exemplary Embodiments

The person skilled in the art will recognize that additional embodiments according to the invention are contemplated as being within the scope of the foregoing generic disclosure, and no disclaimer is in any way intended by the following, non-limiting examples.

Power Outlet Assemblies for Enclosure Installation

As described above, one possible hazard that can arise when incorporating a general purpose power outlet into an enclosure, such as a cabinet is that a user may interconnect an electrical device or appliance that generates heat (such as a hair dryer, curler, etc. in a bathroom cabinet or drawer) and leave that device in operation, and unattended, within the enclosure thus creating a potential fire hazard. Accordingly, many embodiments of power outlet assemblies are configured with safety interlocks adapted to prevent electrical devices and appliances from creating a hazardous condition within an enclosure.

Current Limiting Safety Interlocks

In many embodiments such a safety interlock might include a current limiting device, such as a fuse or circuit breaker that would restrict the total current capable of passing through the power outlet assembly to a level suitable only for low amperage electrical device or appliances, such as for the charging of personal electronics, rechargeable batteries, flashlights, etc. In such embodiments, the power outlet assembly is adapted such that a hazard within the enclosure is incapable of being created.

Figure 2A:
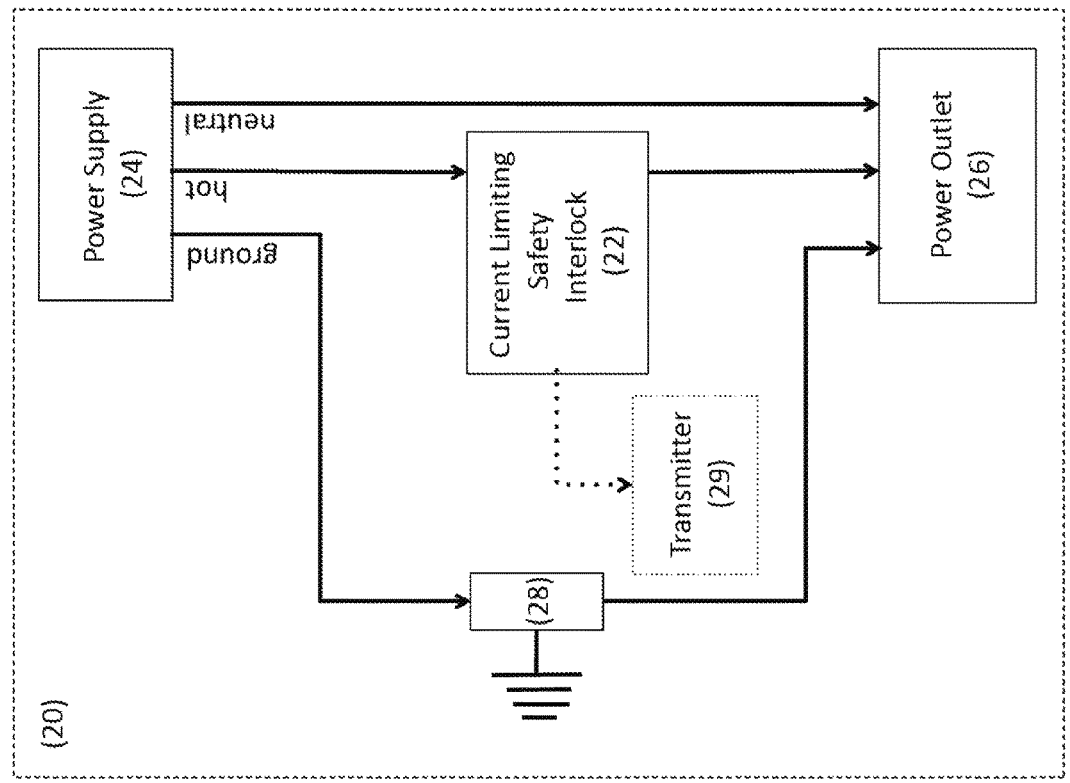
FIG. 2a provides a schematic of power outlet circuitry incorporating a current limiting safety interlock in accordance with many embodiments of the invention.

FIG. 2a provides a schematic wiring diagram in accordance with embodiments of such a current limiting power outlet assembly (20). As shown, in some such configurations a current limiting safety interlock (22), such as, for example, a circuit breaker and reset or a fuse, may be interconnected on the hot wire between the power source (24) and power outlet (26) to provide only sufficient power for low voltage and low current recharge of electronic devices. As shown, this safety interlock would be in addition to any standard ground (28). In such embodiments the circuit could be protected, for example, by a 3A circuit breaker so that the whole circuit would be limited to 3A or less, although any suitable current limiting circuit and current level could be implemented. In addition, as many low current applications require DC no AC power, the circuit could also include a suitable rectifier or transformer capable of conditioning the electrical output to suit the specific purpose.

As described above, such a current limiting safety interlock power outlet assembly may include any other suitable or desired circuitry or hardware for additional safety or functionality. In particular, the power outlet assembly may optionally include a transmitter (29) for communicating information about the power outlet usage, as well as the activation of the safety interlock to a user. Such a transmitter may be wireless or wired, and use any message and transmission format desired.

Hazard Sensing Safety Interlocks

Although current limiting the power outlet assembly, as proposed in the embodiments above, is one method of preventing the creation of a hazardous condition within the enclosure, in many embodiments it is necessary and desirable to maintain the power outlet as a general purpose outlet capable of operating a wide variety of electrical devices and appliances, including electrical devices and appliances that require high current (e.g., 15A and above), including many common kitchen and bathroom appliances, such as, for example, hair dryers, hair curlers, electric toothbrushes, blenders, mixers, etc. Accordingly, in many embodiments power outlet assemblies are provided that incorporate a hazard sensor safety interlock, such that upon detection of a hazardous condition the power from the power source would be interrupted.

Figure 2B:
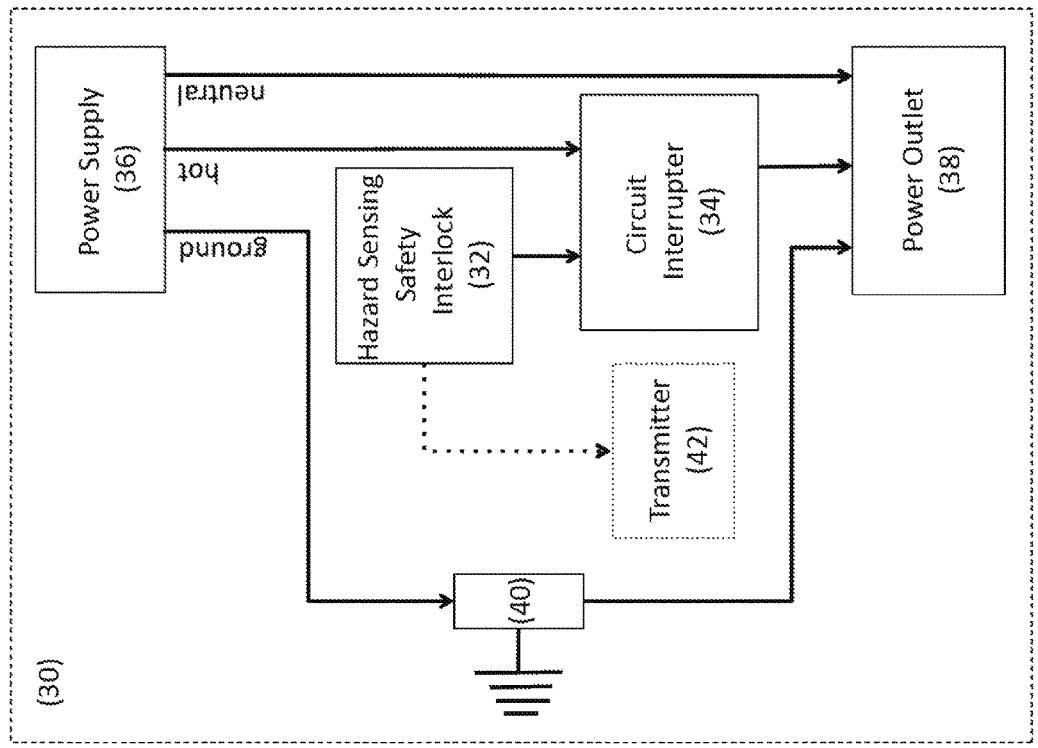
FIG. 2b provides a schematic of power outlet circuitry incorporating a hazard sensor safety interlock in accordance with many embodiments of the invention.

FIG. 2b provides a schematic wiring diagram in accordance with embodiments of such a hazard sensing power outlet assembly (30). As shown, in some such configurations a hazard sensing safety interlock (32) is placed in signal communication with a circuit interrupter (34), such as, for example, a circuit breaker, reset or a fuse, itself interconnected on the hot wire between the power source (36) and power outlet (38) such that on detection of a hazardous condition within the environment of the enclosure the circuit interrupter would be triggered thus preventing further power from flowing into the outlet. Although the schematic shows the safety interlock and circuit interrupter as separate devices, in embodiments the two could be combined into a single device. As above, this safety interlock would be in addition to any standard ground (40), or other standard circuit protective hardware or software.

Figure 3:
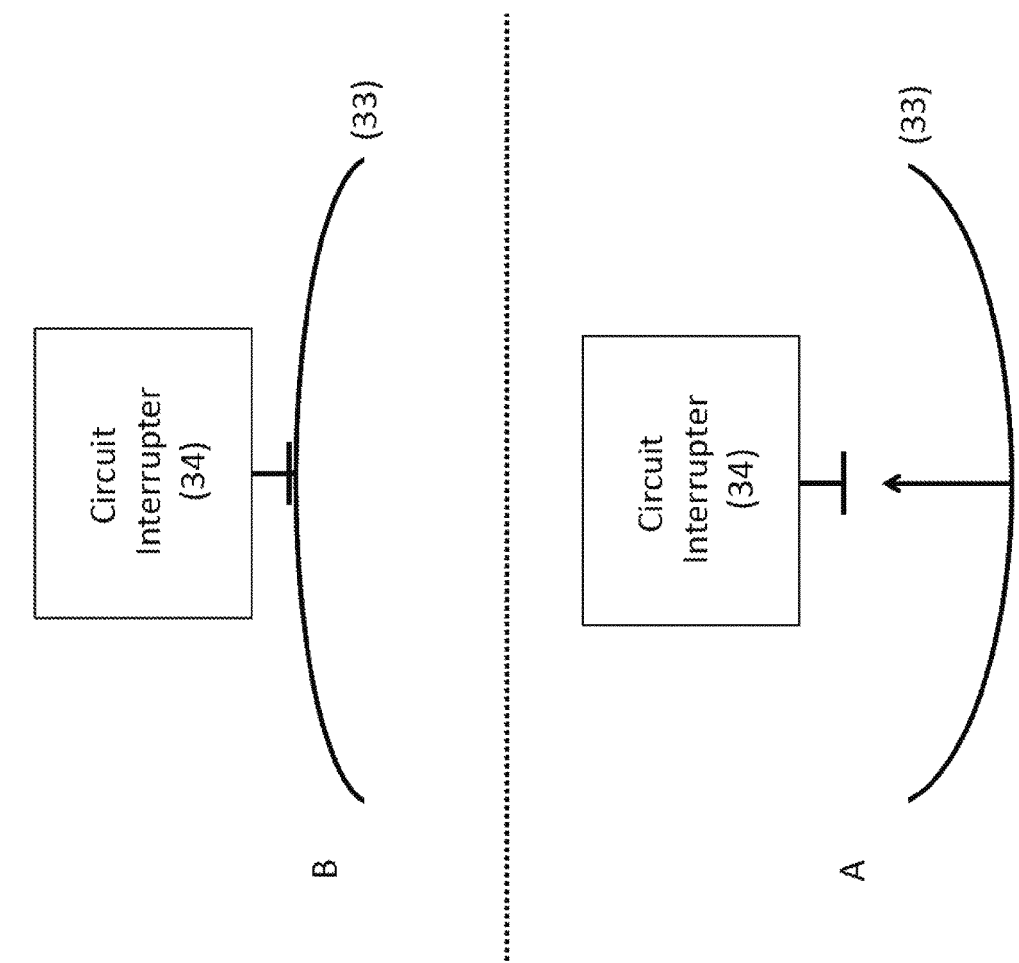
FIG. 3 provides a schematic of a heat sensor safety interlock in accordance with many embodiments of the invention.

Turning to the hazard sensing safety interlocks, while there are a number of well-known systems available for detecting and preventing a dangerous electrical condition, such as from a ground or arc fault, from occurring within an electrical circuit, these systems only address issues that arise from an electrical fault, either in the wiring of the outlet or in the operation of the electrical device/appliance attached thereto. However, as discussed above, where an outlet is to be installed within an enclosure, additional hazards can arise even where both electrical circuit and electrical device/appliance are operating satisfactorily. Accordingly, in embodiments a hazard sensor safety interlock is to be understood to refer to a sensor adapted to detect a potential hazardous condition created by the operation of an electrical appliance or device within the enclosure, such as overheating or fire, by monitoring the environment of the enclosure. In some exemplary embodiments the hazard sensor is one of either a smoke, toxic gas ($CO$, $CO_2$, e.g.) and/or heat sensor. In one exemplary embodiment the heat sensor is comprised of a resettable mechanical thermostat that activates when a specific threshold temperature is reached. A diagram of an exemplary embodiment of a suitable thermostatic heat sensor is shown schematically in FIG. 3. In this embodiment a thermostatic sensor (33) formed of a temperature sensitive bimetal is disposed within the hazard sensor. Such bimetal elements deform once a threshold temperature is reached. As shown, in many embodiments the bimetal element (33) would be disposed in relation to a circuit interrupter (34) (FIG. 3, view A) such that when the threshold temperature is reached the bimetal element would trigger the circuit interrupter (FIG. 3, view B) thereby removing electrical current from the power outlet.

Such a hazard sensing safety interlock power outlet assembly may additionally include any other suitable or desired circuitry or hardware for additional safety or functionality. In particular, the power outlet assembly may optionally include a transmitter (42) for communicating information about the power outlet usage, as well as the activation of the safety interlock to a user. Such a transmitter may be wireless or wired, and use any message and transmission format desired.

Although not shown, in some configurations the one or more hazard sensing safety interlocks could be combined with a current limiting safety interlock, such as, for example, the one described in relation to FIG. 2a, along with a rectifier or transformer capable of conditioning the electrical output to suit the specific purpose.

Movable Power Outlet Assemblies

Although the above discussion has focused on power outlet assemblies without reference to whether the assembly is adapted for installation in either fixed or movable enclosures, in many embodiments the power outlet assemblies are specifically adapted for installation in an enclosure where the power outlet of the power outlet assembly is movable relative to the power source for the enclosure. In such embodiments, flexible and extendable electrical interconnectors are provided such that hazards associated with repeated motion of the power outlet relative to the power source, and extension and contraction of the flexible and extendable electrical interconnectors, particularly within the confined space of the enclosure, namely pinching, cutting, binding, minimal bend radius, tangling, etc. are prevented. Such hazards can cause chaffing, wear and ultimate failure of the flexible electrical connector, in turn giving rise to a short circuit, thus creating a potential fire hazard.

Other designs have been suggested for such moveable power outlet assemblies, but these designs have limitations when attempts have been made to implement them within enclosures. In particular, each of these designs have a dimensional thickness between the power outlet and the power source that has a minima set by a minimum bending radius determined by the radius at which the wire may undergo damage from overbending or pinching. Some exemplary power outlets are shown in FIGS. 4a to 4d.

Figure 4A:
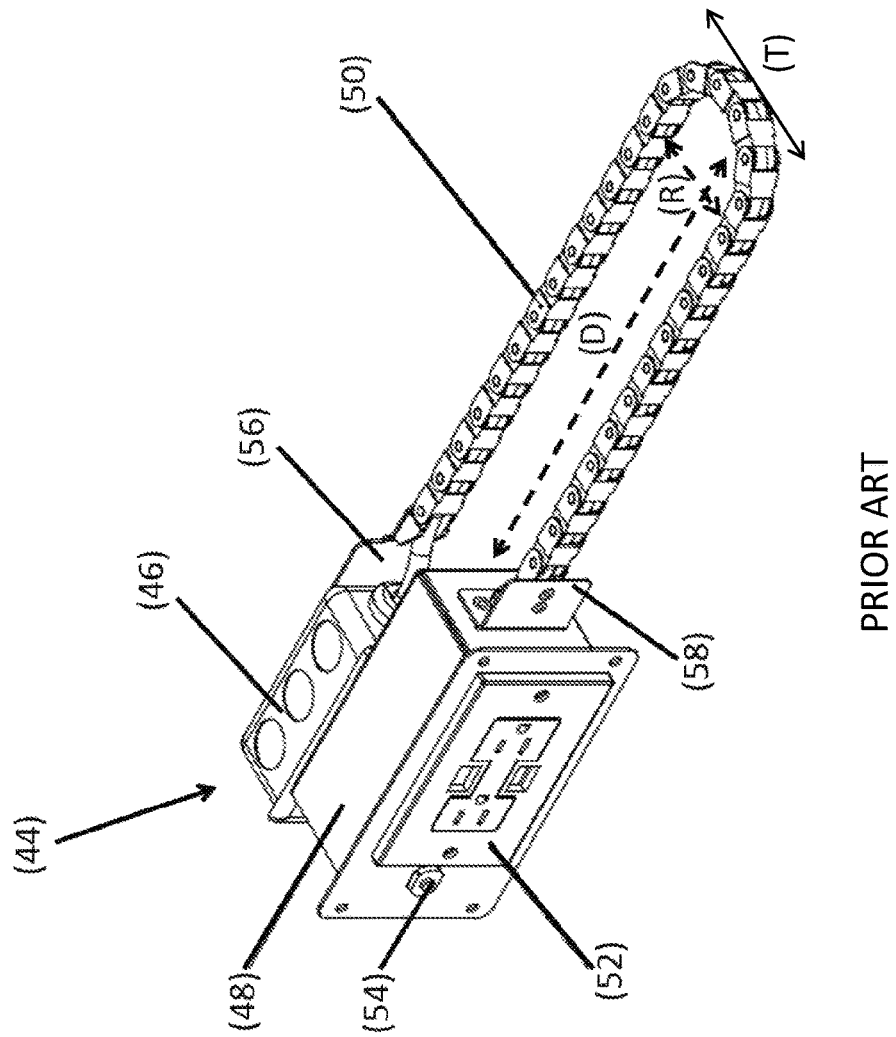
FIGS. 4a to 4d provides schematics of power outlet assemblies adapted for installation in movable relation to the power source in accordance with the prior art.

For example, FIG. 4a provides a diagram of one such moveable power outlet assembly. In this example, the movable power outlets (44) comprise generally a fixed power source (46) where the power from outside an enclosure enters the enclosure, a movable outlet box (48), and a flexible wire conduit interconnected therebetween (50). The power outlet may include any suitable power socket (52), such as, for example, two and three prong power sockets, electronic connectors (such as USB, firewire, thunderbolt, etc.), internet connector, and combinations thereof. As described above, the power outlet may also include a safety interlock, such as, for example, a resettable safety interlock (54), which may be a current limiting safety interlock or a hazard sensing safety interlock, or a combination thereof, for example. Turning to the flexible electrical interconnector, as shown in FIG. 4a, the flexible/extendable electrical interconnection (50) comprises an electrically conductive wire disposed within a flexible conduit formed of a flexible cable chain that connects at a connection point (58) of the outlet box (48). The flexible conduit defines a thickness 'T' between the outlet box (48) and the power source (46).

Figure 4B:
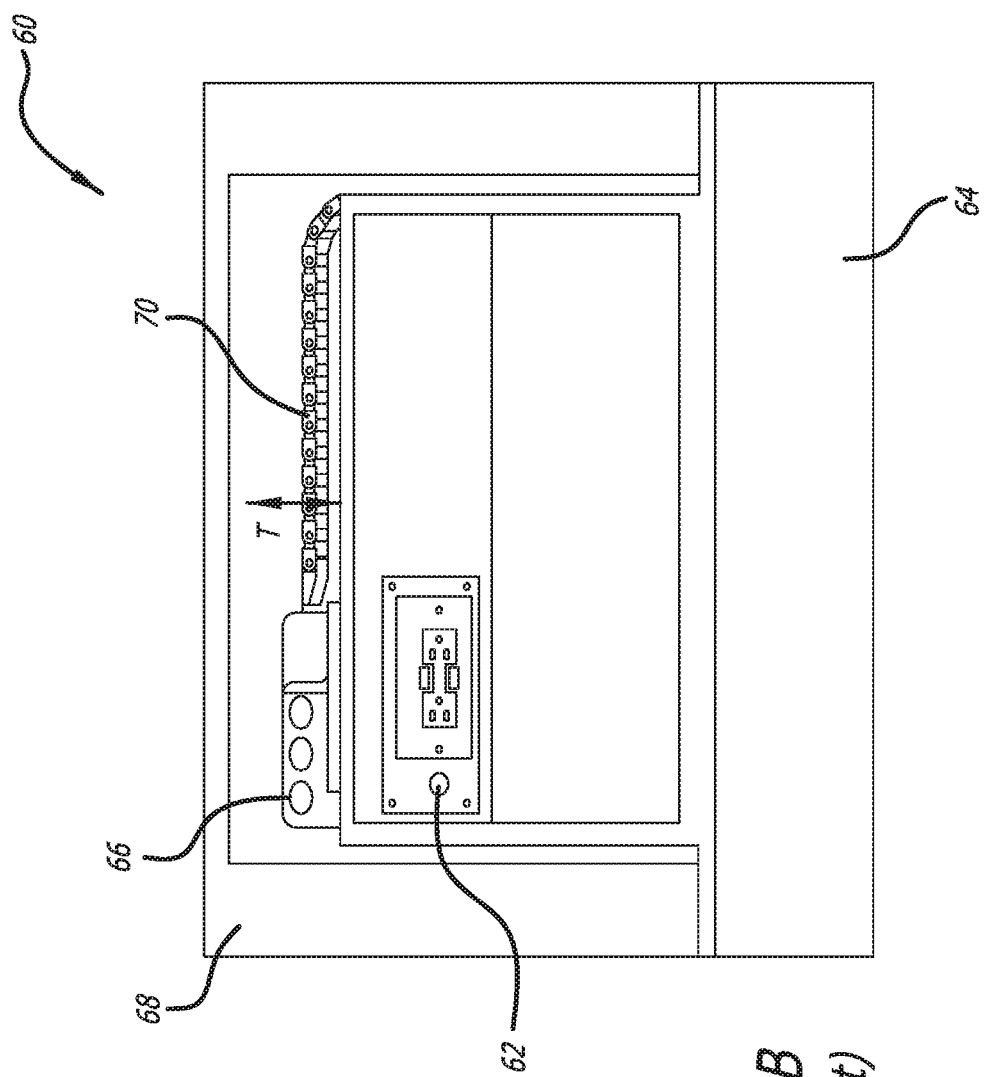

The power outlet assembly of such a design may be incorporated into a movable portion of an enclosure (60). An exemplary embodiment of a movable outlet (62) integrated into an enclosed drawer (64) is shown schematically in FIG. 4b. As described above, the power outlet assembly may include a power source (66) that would be attached to one of the fixed portions (68) of the drawer unit (60). The power outlet (62) would then be incorporated into a portion of the movable portion of the enclosures (in this example a slidable drawer (64) of the enclosure). As shown in FIG. 4b, the outlet box (62) would be positioned at the rear of the enclosure, such that it would only be accessible when the movable portion of the enclosure is in an extended or open position, although other arrangements can also be contemplated, as will be described in greater detail below. The flexible/extendable electrical interconnection (70) is then interconnected between the fixed power source and the movable power outlet, and provided with sufficient flexibility and travel such that the electrical interconnection is maintained between the source and outlet across the entire length of the movable enclosure's motion. As discussed above, the thickness 'T' of the flexible/extendable electrical interconnection defines the distance required between the rear of the slidable drawer (64) and the wall of the enclosure (68).

Figure 4C:
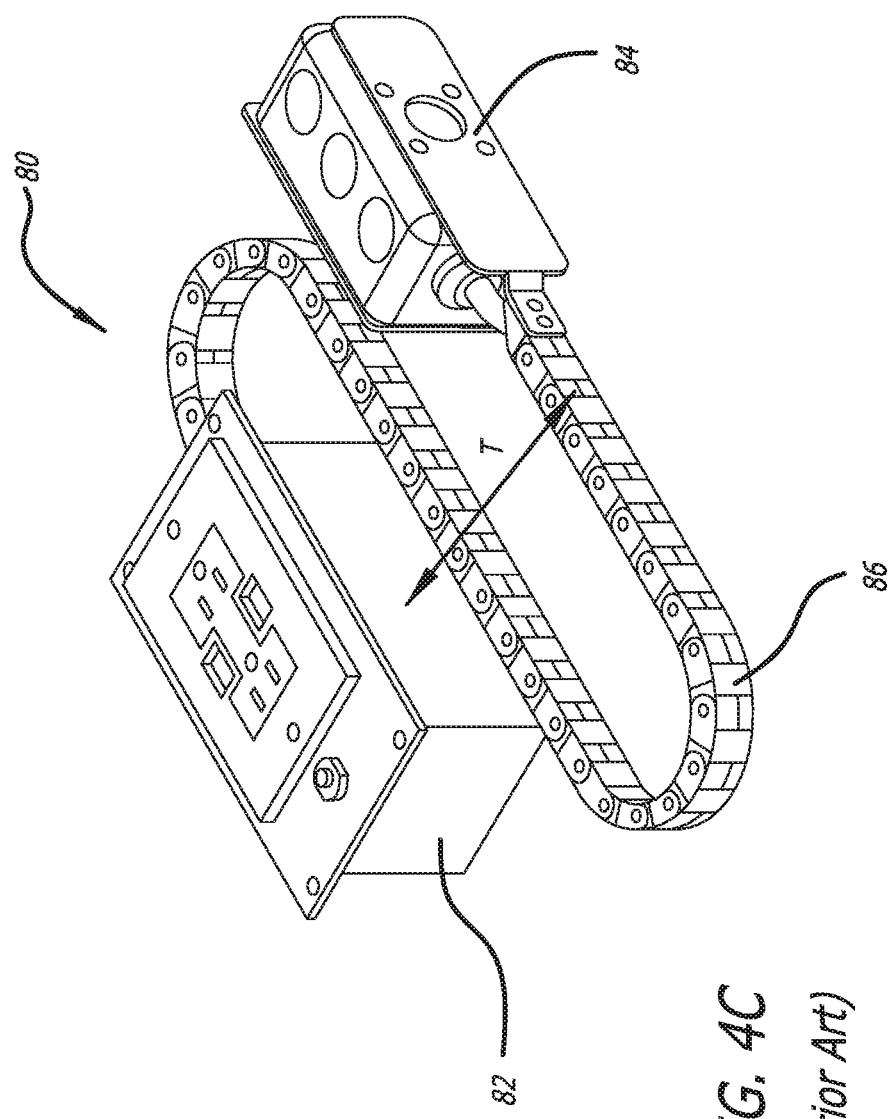

FIG. 4c provides an example of a power outlet assembly (80) adapted such that the power outlet (82) has a horizontal orientation. In this example the power source (84) and the flexible electrical interconnection (86) may be disposed such that the flexible electrical interconnection forms a U-bend, a stacked U-bend, or as shown, an S-bend. Regardless of the specific configuration the flexible electrical interconnection requires a defined space T between the power outlet and the power source to prevent overbending, that is so that the flexible interconnection does not bend at an angle below a minimum bending radius.

Figure 4D:
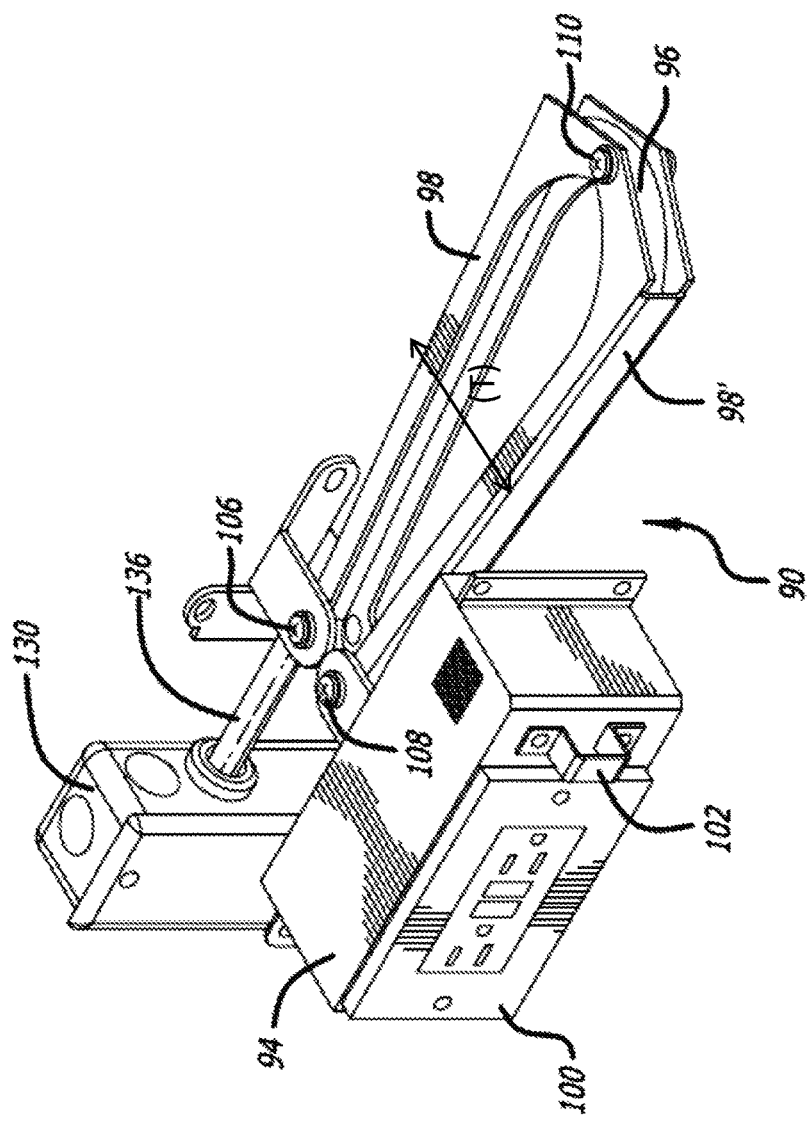

Finally, FIG. 4*d* shows and example of a movable power outlet (90) comprising a fixed power source (130) where the power from outside an enclosure enters the enclosure, and a movable outlet box (94) may incorporate a wire conduit interconnected therebetween (96) that is formed from at least rigid arms (98 & 98') that are pivotally interconnected in at least three points (106, 108 & 110). As in previous examples, the fixed power source (130) and the power outlet (94) may take the form of any suitable/desired power input and output as long as the position of the power source relative to the enclosure is static, i.e., fixed relative to the enclosure; and the position of the power outlet itself is dynamic, i.e., movable relative to the placement of the power source. In particular, the power outlet may include any power socket (100), such as, for example, two and three prong power sockets, electronic connectors (such as USB, firewire, thunderbolt, etc.), internet connector, and combinations thereof. As described above, the power outlet may also include a safety interlock, such as, for example, a resettable safety interlock (102), which may be a current limiting safety interlock or a hazard sensing safety interlock, or a combination thereof, for example.

In all of these examples, the flexible conduit and flexible electrical interconnector are adapted to provide an extendable and contractable electrical interconnection between the fixed power source and the movable power outlet that is able to extend/contract and provide an electrical interconnection between the power source and power outlet across the entire travel length of the movable power outlet. The conduit is adapted to at least partially enclose and restrict the motion of the electrically conductive wire to prevent tangling and pinching of the conductive wire, and to ensure that the wire is not bent beyond a specified minimum bend radius (R) at which the wire may undergo damage from overbending or pinching, as shown in FIG. 4*a*. To ensure sufficient travel to the flexible interconnection and a bend radius for the conductive wire greater than (R), there is a certain lateral distance into which the flexible electrical interconnector can fold (as shown by the arrow 'D' in FIG. 4*a*), and this distance must be long enough to hold the entire length of the conduit. If more travel is desired, the conduit has to stick out more and requires a larger portion of the enclosure be designated as storage space for the electrical interconnection. The combination of the minimum radius (R) and the lateral distance (D) determines a minimum thickness (T), which is defined as the minimum required distance between the power outlet and the power source required to accommodate the flexible conduit and electrical interconnector, into which all the moveable power outlet designs can fold.

The physical distance T required by the flexible electrical interconnector puts a constraint on how much space is needed between the enclosure and the moveable element to which the power outlet is attached (e.g., the drawer), this space may be referred to hereinafter as the "footprint" of the moveable power outlet. In all of the designs thus provided, the flexible electrical interconnector is contained within a horizontal plane defined within the space between the enclosure and the moveable element to which the power outlet is attached. As a result, the footprint of one of these moveable power outlets often exceeds the standard space provided, and either the wall of the enclosure must be extended (which is very expensive), or the moveable element must be reduced in size (which reduces the storage space with the element) to accommodate the device.

Reduced Footprint Movable Power Outlet Assemblies

In accordance with embodiments, as shown in FIGS. 5*a* and 5*b*, movable power outlets (140) comprising a fixed power source (142) where the power from outside an enclosure enters the enclosure, a movable outlet box (144), and a wire conduit interconnected therebetween (146). In such embodiments, the wire conduit is formed from at least two rigid arms (148 & 148') that pivotally interconnect about a pivot axis (V) disposed transverse to the extension direction (E), and where the minimum bend radius (R) is defined along the pivot axis (V) and the rigid arms are disposed vertically adjacent to one another when in a compacted configuration. It will be understood for the purposes of these embodiments that the term "rigid" shall be taken to mean an elongated body that is unbendable along its length.

Figure 5C:
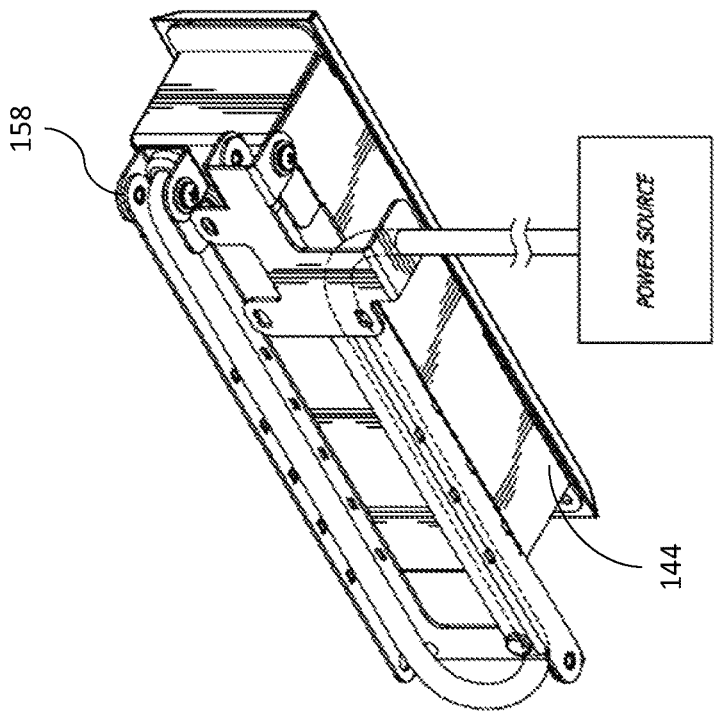

In accordance with such embodiments, the footprint (T) of the moveable power outlet can be made independent of both the minimum bending radius (R) and the lateral distance (D) of the flexible interconnection, such that the thickness (T) is dependent instead on the thickness of the power outlet (144). To accomplish this, as shown in FIG. 5*c*, the rigid arms (148 & 148') are configured such that they compact within a vertical plane disposed at the rear of the power outlet (144) and defined along the pivoting axis (V), which is transverse to the direction of extension (E) of the power outlet. As shown, in many such embodiments, at least one of the arms (148 or 148') defines a bend that is parallel to the pivoting axis and transverse to the direction in which the arms extend during movement of the power outlet relative to the power source, and which determines the minimum bend radius (R), which is also defined along the vertical plane. During operation the disposition of these elements ensures that the arms, when compacted, are disposed atop one another along the pivoting axis (V). In many such embodiments, the power source (142) may be disposed above or below the power outlet (144) such that the power outlet and power source are disposed within or adjacent to a vertical plane defined by the vertical axis when compacted.

As in previous embodiments, the fixed power source (142) and the power outlet (144) may take the form of any suitable/desired power input and output as long as the position of the power source relative to the enclosure is static, i.e., fixed relative to the enclosure; and the position of the power outlet itself is dynamic, i.e., movable relative to the placement of the power source. In particular, as shown in FIGS. 5*a* and 5*b*, the power outlet may include any power socket (150), such as, for example, two and three prong power sockets, electronic connectors (such as USB, firewire, thunderbolt, etc.), internet connector, and combinations thereof. As described above, the power outlet may also include a safety interlock, such as, for example, a resettable safety interlock (152), which may be a current limiting safety interlock or a hazard sensing safety interlock, or a combination thereof, for example. The movable power outlet may also incorporate an interlock switch (not shown) to engage and disengage the hazard sensing safety interlock based on the relative positioning of the power outlet and power source.

In some embodiments, as shown in FIGS. 5*a* and 5*b*, the flexible/extendable electrical interconnection (146) comprises an electrically conductive wire (154) disposed within a rigid, but pivotable conduit (146), the conduit being adapted to at least partially enclose and restrict the motion of the electrically conductive wire to prevent tangling and pinching of the conductive wire. Additionally, the pivotable conduit may be adapted to ensure that the wire is not bent beyond a specified minimum bend radius (R) at which the wire may undergo damage from overbending or pinching by providing a predefined conduit pathway itself having a specified bend radius. Such a minimum bend radius is dependent on the gauge and type of conductive wire being used, and may be determined by reference to manufacturer specifications.

In the embodiment shown in FIGS. 5a and 5b, the conduit is formed of a plurality of pivotally interconnected rigid arms (148 & 148') that form a pair of curved conduits that at least partially surround the conductive wire (154) on at least three sides. In some such embodiments the walls of the rigid arms at least protect the inner radius of the curved path defined by the rigid arms. In other embodiments the walls of the rigid arms further protect the upper and lower surfaces of the conductive wire. In still other embodiments the rigid arms may fully enclose the conductive wire. Such rigid arms provide the benefit of providing substantially greater protection against unwanted damage and wear in the electrical interconnection. In particular, other more flexible conduits may themselves be bent in undesired directions or overbent beyond the minimum bend radius of the conductive wire.

Although, such rigid arms provide additional protection, they also require substantial additional engineering and arrangement to allow for the controlled relative movement of all the require parts of the movable power outlet. In many embodiments, an arrangement of multi-pivotable rigid conduit arms are provided that allow for the relative movement of the plurality of rigid arms about at least three pivot points. In particular, in the embodiment of the conduit shown in FIGS. 5a and 5b, in which the conduit makes a single turn and the rigid arm is attached to the back portion of the power outlet (144), the length of the fold of these rigid arms (148 & 148') is at least half of the total travel length of the moving portion of the enclosure, such as, a drawer. The requirement of the physical distance required by the flexible electrical interconnector puts a constraint on either the travel of the movable portion of the enclosure, or the size of the enclosure required to contain the flexible electrical interconnection. Accordingly, in many embodiments, where two rigid arms are used, each arm extends at least half the total travel length of the moving portion of the enclosure, and three pivot points are provided one each (156 & 158) at a first end of the two arms adjacent the power outlet and power source, and a third (160) distal to the power outlet and power source where the two arms interconnect. To prevent the rigid arms from pivoting in an undesired direction, i.e., bending back upon themselves, when being refolded from an extended position, the pivoting points may include a stop that prevent the pivoting of the arms beyond a critical angle, such as, for example, beyond 180 degrees.

Finally, joining armatures (112 & 114) may also be incorporated into one or both of the power source (e.g., plug and/or junction box) and outlet box where the flexible wire conduit pivot points attach thereto to prevent the overbending of the electrical interconnection as it enters the power outlet and/or power source, thus preventing the cutting and chaffing of the wire and wire conduit against the power outlet and power source enclosures (not shown) during the relative movement thereof.

Figure 5D:
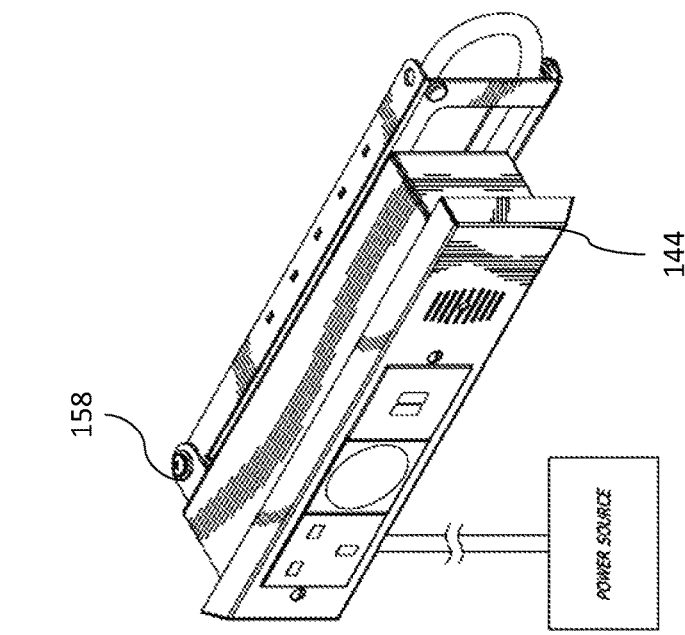

Although embodiments of rigid arm conduits interconnected at the side of the power outlet enclosure are shown in FIGS. 5a and 5b, the interconnection with the rigid arm conduit may be made anywhere along the enclosure of the power outlet. For example, as shown in FIGS. 5c and 5d, the rigid arms may be interconnected at a side of the enclosure the power outlet. It should be understood that the length of the second, distal rigid arm (148') that is interconnected with the power outlet enclosure will depend on the interconnection point on the power outlet. In some such embodiments, where the second, distal rigid arm (148') is interconnected on the proximal end of the power outlet enclosure (144) the rigid arm is shortened by a length equivalent to the length of the power outlet enclosure (144). In such embodiments the third pivot point (158) may be attached in line with the second, rigid arm (148') such that the power outlet enclosure pivots independently of the rigid arm itself. As in the embodiments shown in FIGS. 5a and 5b, the rigid conduit arms (148 & 148') may be interconnected with the power source (142) and power outlet (144) via joining armatures that provide a rigid point of connection and also a fixed path at the point of entry of the conductive wire (154) to the power source (143) and the power outlet (144) thus preventing the cutting and chaffing of the conductive wire.

As shown in FIG. 5, the design of the power source and the power outlet in these embodiments may take any suitable form. For example, the power outlet (144) may incorporate power, USB or any other suitable conductive connector. Likewise, the power source may incorporate a plug (162) as shown in FIGS. 5a and 5b or a fixed junction box. Embodiments may also incorporate combinations of these elements as required for the specific implementation.

Finally, although embodiments of a two rigid arm configuration have been described, however, flexible electrical interconnectors having more compact designs may also be provided. In one such embodiment, an electrical interconnection may be provided, which, rather than having a flexible conduit that simply extends out in a single U shape, has a conduit that has three or more rigid arms that are folded into two or more "U-bends" that are each interconnected at pivot points that allow the multiple U-bends to extend into an elongated configuration when the enclosure is extended, and contract into a parallel stacked configuration when the enclosure is contracted. The number and configuration of these plurality of rigid arms may be configured in any manner desired so long as the flexible conduit may be contained within the space allowed by the enclosure, and such that the conduit is not bent below the minimum bend radius.

Figure 6A:
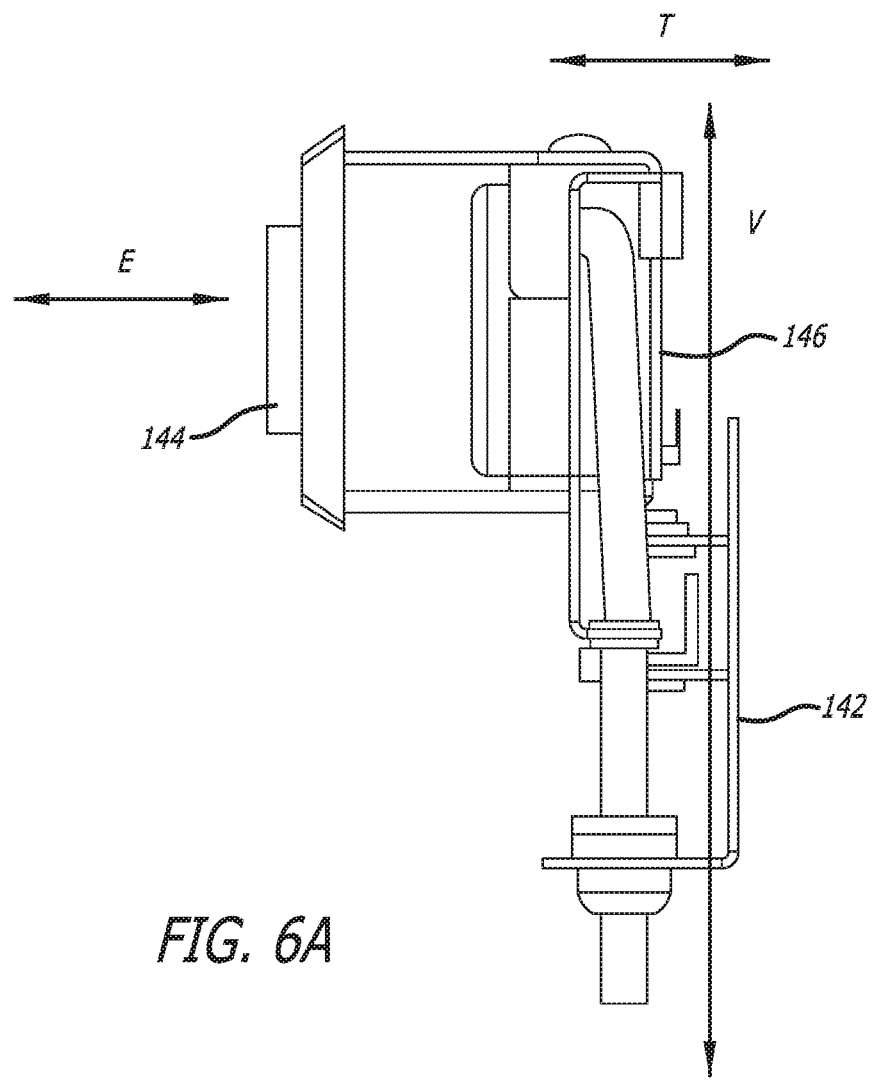
FIGS. 6a to 6d provides a schematic of a power outlet assembly adapted for installation in movable relation to a power source in an extended configuration in accordance with embodiments of the invention.
Figure 6C:
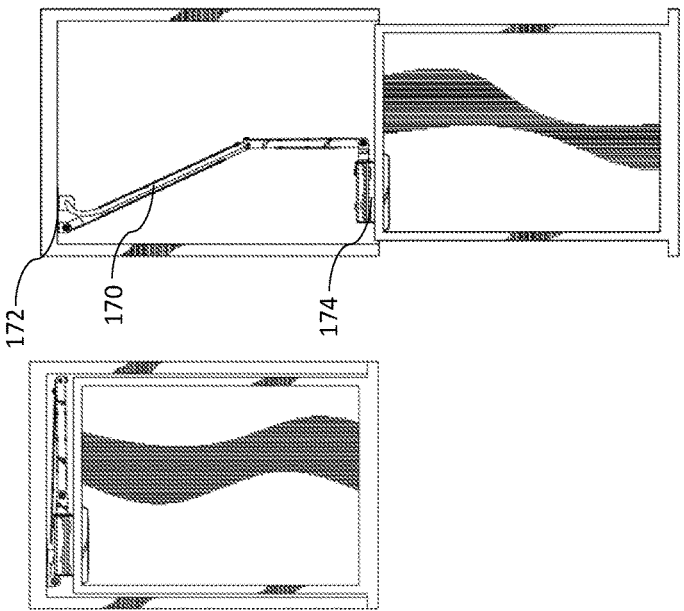
Figure 6B:
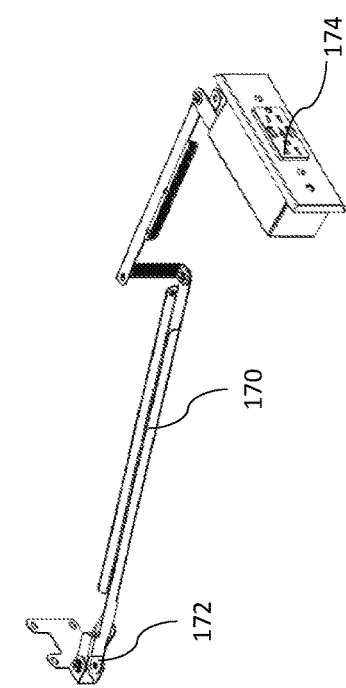
Figure 6D:
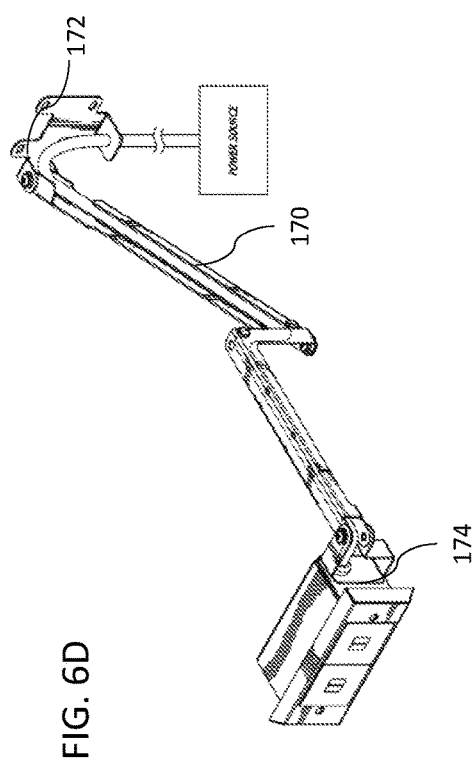

Turning to the flexible conduit and flexible electrical interconnector (170), as described above in greater detail, it should be understood that any structure adapted to provide an extendable and contractable electrical interconnection between the fixed power source (172) and the movable power outlet (174)(as shown in FIGS. 6a to 6d), and that folds to compact within a vertical plane (V) disposed transverse to the direction of elongation (E), may be used, as shown in FIG. 6c. Having such a folding configuration allows the power source to be disposed in line with the power outlet when compacted, such that the footprint of the flexible electrical interconnector (T) is not defined by either the minimum bend radius (R) or the displacement length (D) of the rigid arms.

International Implementations

Figure 7:
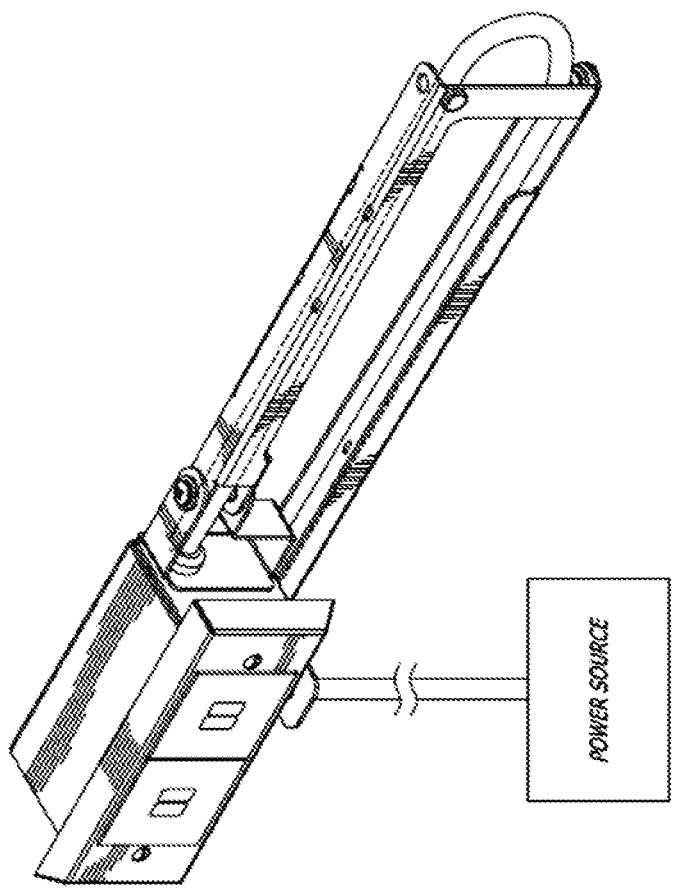
FIG. 7 provides a front view schematic of a power outlet assembly in accordance with embodiments of the invention.

Although the embodiments thus described have shown power outlets incorporating standard U.S. outlet configurations, as shown in FIG. 7, the moveable outlet incorporate any desired outlet configuration, including all international outlets types, such as for example, those found in Europe and Asia.

DOCTRINE OF EQUIVALENTS

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A power outlet assembly for an enclosure comprising:
    at least one power outlet electrically interconnectable with at least one electrical device;
    at least one power source electrically interconnected to said at least one power outlet for providing a source of electrical energy to said power outlet, wherein the power outlet is movable within a defined range relative to said power source along a predefined path at least between a first position where the power outlet is distal to the power source and a second position where the power outlet is proximal to the junction box;
    an arm disposed in pivoting relationship between the at least one power outlet and the at least one power source, the arm formed of two rigid elongated arms, wherein a first rigid elongated arm has a first end that is pivotable about a point proximal the power source, wherein a second rigid elongated arm has a first end that is pivotable about a point proximal the power outlet, wherein the first and second rigid elongated arms are pivotally interconnected at a second end of each thereof about a pivoting axis transverse to the direction of the predefined path such that that first and second rigid elongated arms are positioned vertically adjacent to each other when disposed in the second position;
    a flexible electrical interconnector disposed along the arm in a conductive relation between the power source and power outlet, said flexible electrical interconnector adapted to provide a continuous electrical interconnection between the power source and power outlet without restricting the range of motion of the power outlet relative to the power source within said defined range such that continuous power is supplied from the power source to the power outlet independent of the relative positions of the power source and power outlet;
    at least one safety interlock having at least one sensor capable of detecting at least one hazardous condition within the environment of said enclosure, the at least one safety interlock being adapted to interrupt the flow of electrical current between the at least one power source and the at least one power outlet upon detection of one or more of the at least one hazardous conditions;
    wherein the at least one power outlet is accessible to the at least one electrical device along the entire defined range of the predefined path; and
    wherein the first and second elongated arms have one of the following configurations:
        wherein a first end of the first rigid elongated arm distal to the power source comprises an angled portion that is bent transverse to a longitudinal axis of the first rigid elongated arm and parallel to the pivoting axis, and wherein the first rigid elongated arm is pivotally joined to the second rigid elongated arm through said angled portion, or
        wherein a first end of the second rigid elongated arm distal to the power source comprises an angled portion that is bent transverse to a longitudinal axis of the second rigid elongated arm and parallel to the pivoting axis, and wherein the second rigid elongated arm is pivotally joined to the first rigid elongated arm through said angled portion.

2. The power outlet assembly of claim 1 wherein the at least one sensor is selected from the group consisting of a smoke detector, heat detector, and toxic gas monitor.

3. The power outlet assembly of claim 1, further comprising a current limiting safety interlock adapted to prevent the flow of current above a specified amperage from the power source to the power outlet.

4. The power outlet assembly of claim 1, further comprising a rectifier in electrical connection with the power source and adapted to convert the incoming electrical current from AC to DC.

5. The power outlet assembly of claim 1, further comprising a transmitter in signal communication with the at least one safety interlock for communicating the status of the power outlet assembly to a user, and wherein the transmitter is configured to automatically transmit upon activation of any one of the at least one safety interlocks.

6. The power outlet assembly of claim 1, wherein the power source is in a fixed position and the power outlet is movable relative to said power source.

7. The power outlet assembly of claim 1, further comprising at least one safety interlock switch configured to activate the operation of the at least one safety interlock when the power outlet is in the second position and deactivate the at least one safety interlock when the power outlet is in the first position.

8. The power outlet assembly of claim 1, wherein the first and second rigid elongated arms combine to provide a predefined curved path to the flexible electrical interconnector such that the flexible electrical interconnector is prevented from being bent below a minimum bend radius, the minimum bend radius being defined along a vertical axis disposed transverse to the direction of the pre-positioned path at least when the first and second rigid elongated arms are in the second position.

9. The power outlet assembly of claim 8, wherein the rigid elongated arms collectively define an internal channel within which the flexible electrical interconnector is disposed and at least partially enclosed.

10. The power outlet assembly of claim 9, wherein the flexible electrical interconnector and rigid elongated arms are configured such that when the power outlet is proximal to the power source along the predefined path, the flexible electrical interconnector and the elongated arms are bent into a single U-shape having a first end interconnected with the power source and a second end interconnected with the power outlet and having a bend radius at least equal to the specified minimum bend radius, and wherein the U-shape is disposed has a folded length approximately half the length of the defined range of motion of the power outlet, and is disposed within a vertical plane disposed along the vertical axis.

11. A power equipped enclosure comprising:
    an enclosure defining an internal volume, said internal volume being accessible;

at least one power outlet disposed within the internal volume of the enclosure outlet, the at least one power outlet being electrically interconnectable with at least one electrical device;

at least one power source electrically interconnected to said at least one power outlet for providing a source of electrical energy to said power outlet, wherein the power outlet is movable within a defined range relative to said power source along a predefined path at least between a first position where the power outlet is distal to the power source and a second position where the power outlet is proximal to the power source;

an arm disposed in pivoting relationship between the at least one power outlet and the at least one power source, the arm formed of two rigid elongated arms, wherein a first rigid elongated arm has a first end that is pivotable about a point proximal the power source, wherein a second rigid elongated arm has a first end that is pivotable about a point proximal the power outlet, wherein the first and second rigid elongated arms are pivotally interconnected at a second end of each thereof about a pivoting axis transverse to the direction of the predefined path such that that first and second rigid elongated arms are positioned vertically adjacent to each other when disposed in the second position;

a flexible electrical interconnector in a conductive relation between the power source and power outlet, said flexible electrical interconnector adapted to provide a continuous electrical interconnection between the power source and power outlet without restricting the range of motion of the power outlet relative to the power source within said defined range such that continuous power is supplied from power source to the power outlet independent of the relative positions of the power source and power outlet;

at least one safety interlock having at least one sensor disposed within the enclosure and capable of detecting at least one hazardous condition within the environment of said enclosure, the at least one safety interlock being adapted to interrupt the flow of electrical current between the at least one power source and the at least one power outlet upon detection of one or more of the at least one hazardous condition; and wherein the at least one power outlet is accessible to the at least one electrical device along the entire defined range of the predefined path; and wherein the first and second elongated arms have one of the following configurations:

wherein a first end of the first rigid elongated arm distal to the power source comprises an angled portion that is bent transverse to a longitudinal axis of the first rigid elongated arm and parallel to the pivoting axis, and wherein the first rigid elongated arm is pivotally joined to the second rigid elongated arm through said angled portion, or wherein a first end of the second rigid elongated arm distal to the power source comprises an angled portion that is bent transverse to a longitudinal axis of the second rigid elongated arm and parallel to the pivoting axis, and wherein the second rigid elongated arm is pivotally joined to the first rigid elongated arm through said angled portion.

12. The power equipped enclosure of claim 11, wherein the enclosure includes at least one movable element, and wherein the power source and power outlet are arranged such that the movement of the at least one movable element moves the power outlet relative to the power source.

13. The power equipped enclosure of claim 12, wherein the movable element is a drawer.

14. The power equipped enclosure of claim 12, wherein the power outlet has an orientation selected from one of either disposed vertically in the side of the drawer, or disposed horizontally in the bottom of the drawer.

15. The power equipped enclosure of claim 11, further comprising at least one safety interlock switch configured to activate the operation of the at least one safety interlock when the power outlet is in the second position and deactivate the at least one safety interlock when the power outlet is in the first position.

16. The power equipped enclosure of claim 11, wherein the first and second rigid elongated arms combine to provide a predefined curved path to the flexible electrical interconnector such that the flexible electrical interconnector is prevented from being bent below a minimum bend radius, the minimum bend radius being defined along a vertical axis disposed transverse to the direction of the pre-positioned path at least when the first and second rigid elongated arms are in the second position.

17. The power equipped enclosure of claim 11, wherein the rigid elongated arms collectively define an internal channel within which the flexible electrical interconnector is disposed and at least partially enclosed.

18. The power equipped enclosure of claim 11, wherein the flexible electrical interconnector and rigid elongated arms are configured such that when the power outlet is proximal to the junction box along the predefined path, the flexible electrical interconnector and the elongated arms are bent into a single U-shape having a first end interconnected with the power source and a second end interconnected with the power outlet and having a bend radius at least equal to the specified minimum bend radius, and wherein the U-shape has a folded length approximately half the length of the defined range of motion of the power outlet, and is disposed within a vertical plane disposed along the vertical axis.

* * * * *